March 14, 1961
C. H. PHELPS
2,974,521
VIBRATION MEASURING APPARATUS
Filed June 27, 1956
2 Sheets-Sheet 1
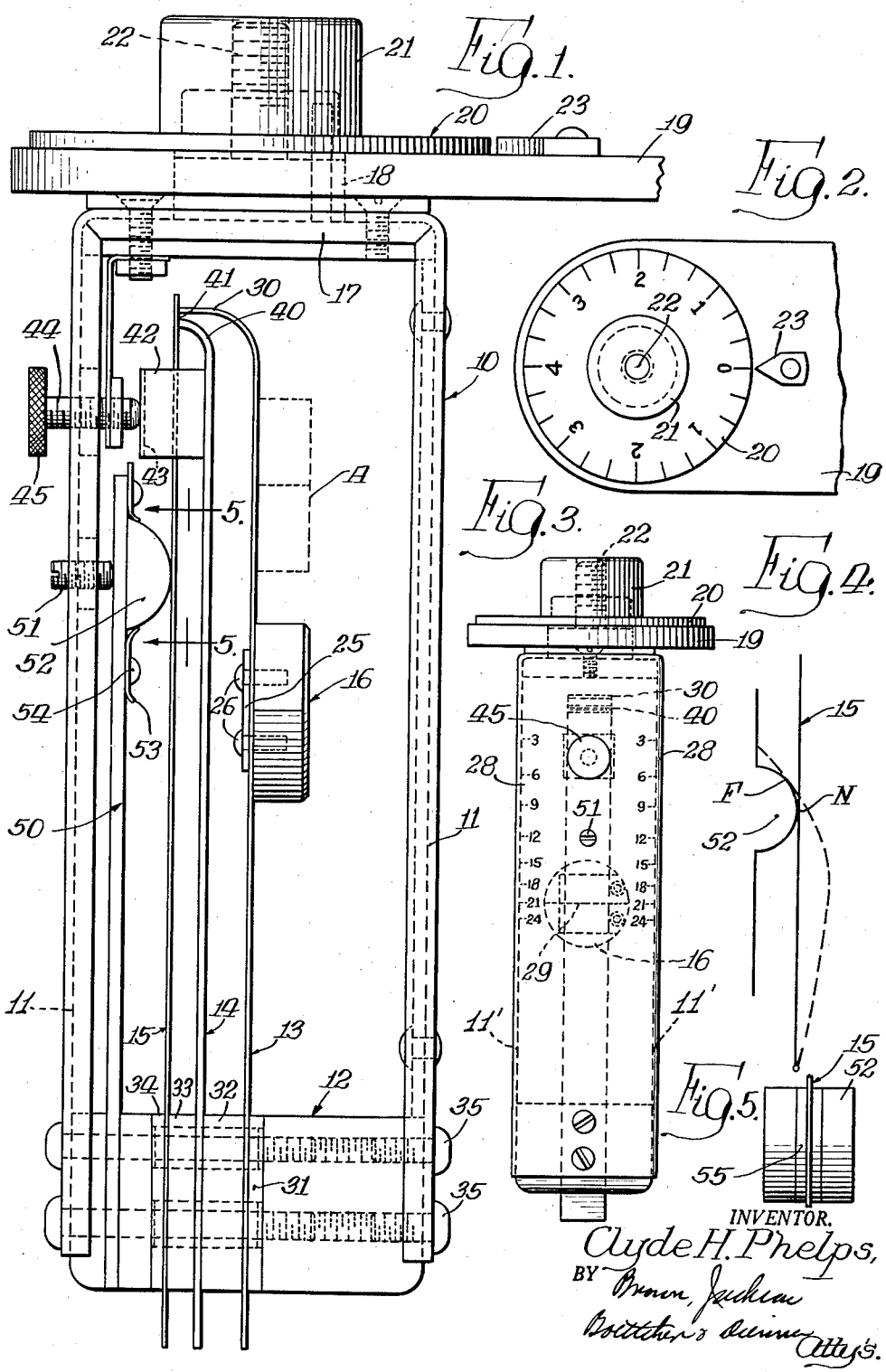
INVENTOR.
Clyde H. Phelps,
BY Brown, Jackson
Boettcher & Dienner
Attys.

INVENTOR.
Clyde H. Phelps,
BY
Atty's

United States Patent Office 2,974,521
Patented Mar. 14, 1961

2,974,521

VIBRATION MEASURING APPARATUS

Clyde H. Phelps, Springfield, Ill., assignor to Vincent J. Getzendanner, Springfield, Ill.

Filed June 27, 1956, Ser. No. 594,227

12 Claims. (Cl. 73—70.2)

This invention relates generally to vibration measuring instruments and indicating apparatus of a type especially adapted for use in detecting and measuring vibration caused by unbalance in a rotating mass.

The present invention is, in particular, adapted for use in connection with any balance testing machine or apparatus wherein the rotating mass under test is mounted for free vibratory motion in a single plane of restricted movement, the movement of the mass in said plane being due to unbalance.

An essential concept of the present invention resides in the application of a vibration responsive indicator or device having a single plane of non-response to vibration, the present indicating apparatus constituting an improvement over the indicator means of my prior Patent No. 2,740,297, issued April 3, 1956, and entitled Balance Testing Means.

Any of several well known mounting systems for the rotating mass may be employed, as for example, a suspension system of music wire attached to journal bearing means arranged to rotatably support the rotor and permitting thereby free movement of such rotor in a horizontal plane. Other devices such as plural flexible steel columns or the like may likewise be employed for suspending the rotating mass; the essential characteristic of any such suspension system being that the rotor be free to move or vibrate in substantially a single plane, which in most cases is preferably horizontal.

In conjunction with the suspension system employed, some means for supporting the rotor at its opposite ends is also required of which again a variety of devices have been perfected; the essential characteristics of such rotor support means comprising bearings or like members which are individually free to move in the said plane of free vibratory motion under the influence of unbalance in the mass when the same is rotated.

The improved indicator means of the present invention is adapted to be mounted or attached to the bearing support system for the rotor mounting so that the same is free to move with the rotor and rotor mounting in the said single plane of free vibratory motion and in response to movement caused by unbalance of the revolving mass. Thus, the present invention, attached to the rotor's mounting means, becomes an integral part thereof and moves with the revolving rotor journals or bearings through the single permissible plane of free vibratory motion. In essence, the rotor mounting system provides a seismic type mounting for the present device so that such moves freely with the mounted rotor and vibrates in space in the plane of the vibratory motion without restraint by connection to any stationary part or support.

Generally speaking, the indicator means of the present invention embodies a spring-weight system having means for selective adjustment of its natural frequency and which characteristically is self-synchronous with the unbalance vibration of the rotating mass over a range of rotational speeds for such mass. The indicator means provides angular indication of the point of unbalance in said mass independent of the rotor's speed and also indicates the amount of unbalance or vibration displacement, again independent of the speed of the rotating mass. Means are embodied, as mentioned, for adjusting the frequency of the spring-weight system so that such system may be adjusted for operation below, above or at its natural frequency; operation at resonant frequency permitting extreme magnification of vibratory motion. As in the indicator means disclosed in my above referred to Patent No. 2,740,296, the spring-weight system of my present indicator means is mounted for rotation about its longitudinal or vertical axis so that the same may be positioned for maximum and minimum response to vibration including a position where such gives zero response to vibration in a selected plane of the rotor under test, but is responsive to unbalance in any other plane taken through such rotor.

In addition to the above described features of the present indicating means, the same generally involves a combination of elements including an electronic switch and circuit arrangement including means to adjust the electronic switch to energize a stroboscopic light at a point in the vibrational cycle of the mass corresponding to the instant the weight spring system is in its neutral unstressed, static position. A variable resistance, constant potential, bridge-potentiometer means is also included, the same being adjustable to zero response at the above named instant of neutrality for the spring-weight system and having means capable of unbalancing the bridge-potentiometer circuit means in proportion to the amplitude of unbalanced motion affecting the spring-weight system during rotation of the mass under test. By this last named innovation, the value of unbalance is presented directly on meter means associated with the bridge potentiometer means.

The main object of the present invention is to provide a new and improved indicator means for measuring and indicating vibration in a rotating mass.

A further important object of the present invention is to provide a new and useful combination of elements in a vibration indicating means embodying a spring-weight system which embodies means for determining the exact position of neutrality for the unstressed spring-weight system as well as means for indicating the precise position of unbalanced forces at various speeds of the rotating mass.

A still further object of this invention is to provide a new and improved vibration responsive indicator means embodying a spring-weight system responsive to vibrational motion which operates to indicate unbalance based on a position of static neutrality for the spring-weight system therein.

Still another object of this invention is to provide a new and improved vibration indicator means of the type aforesaid, embodying new and improved variable resistance means employed in conjunction with a constant potential bridge-potentiometer means operable by the spring-weight system, such that unbalance of the bridge-potentiometer means in proportion to the amplitude of unbalance of the rotating mass affecting the spring-weight system is indicated visually on an electric meter means associated with the bridge-potentiometer means.

A still additional object of this invention is to provide an improved vibration indicator means of the character aforesaid which embodies means to indicate the precise angular position of unbalance in a rotating mass and at various speeds thereof, while indicating the unbalance value on meter means.

The above and further objects, features and advantages of the present invention will be recognized by those familiar in the art from the following detailed descritpion of a preferred embodiment of its concepts as illustrated in the accompanying drawings.

In the drawings:

Figure 1 is an enlarged side elevational view of an indicator apparatus embodying the principles and concepts of the present invention;

Figure 2 is a top plan view of the indicator means set forth in Figure 1 and detailing the index means employed for adjusting the vibrational responsive system therein to various selected angular positions with respect to the longitudinal or rotational axis of the mass being tested;

Figure 3 is a front elevational view of the indicator means set forth in Figure 1, but at a reduced scale thereover, showing index means employed in adjusting the spring-weight system to various vibrational amplitudes;

Figure 4 is a schematic view in side elevation showing somewhat diagrammatically the function of the improved variable resistance means employed in the indicator of this invention;

Figure 6:
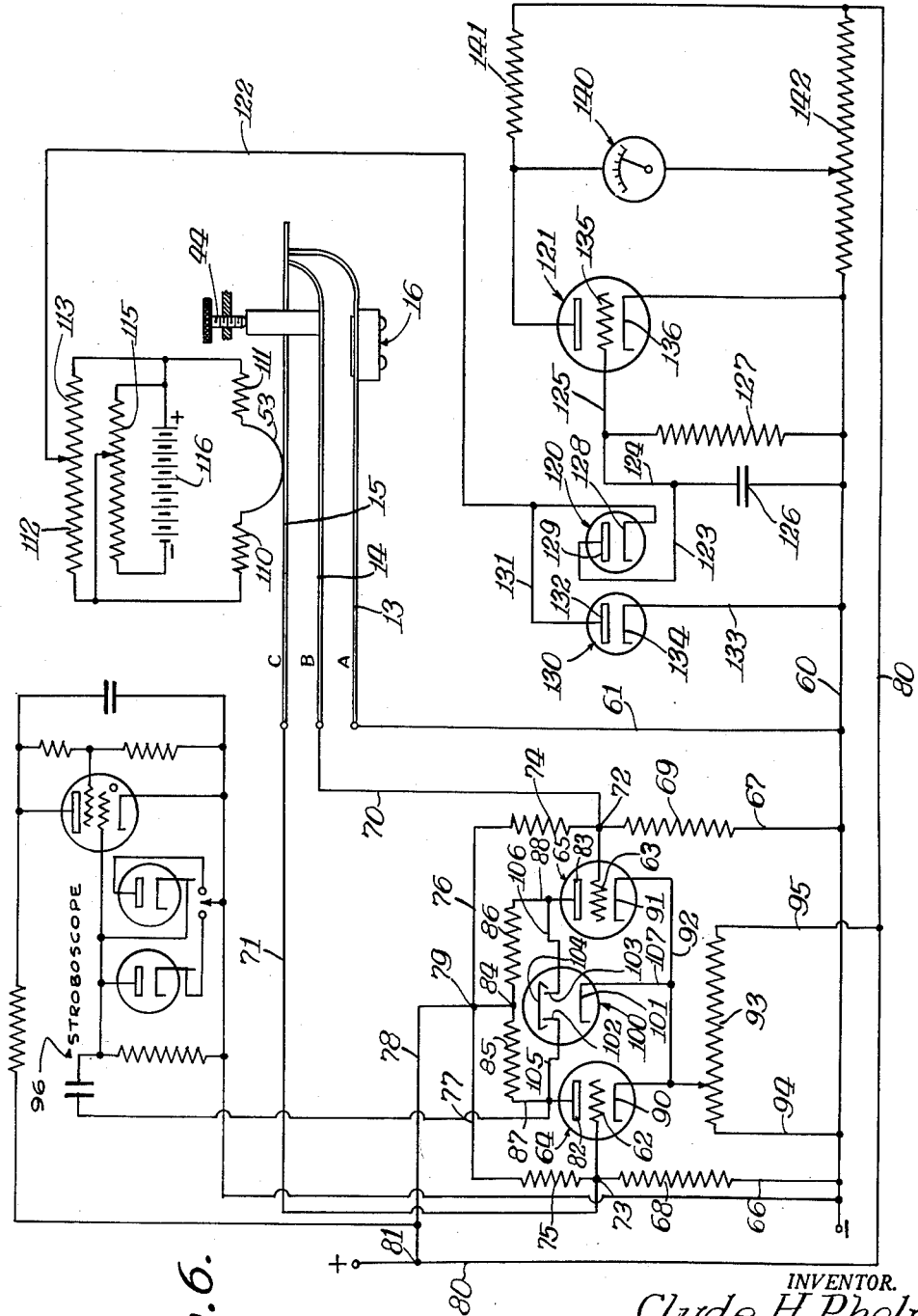

Figure 5 is an enlarged front elevational view of a portion of the variable resistance means illustrated in Figure 4 and taken substantially from vantage line 5, 5 of Figure 1, looking in the direction of the arrows thereon; and Figure 6 is a circuit diagram and schematic representation of the operating elements of the indicator means of this invention and preferred electric circuitry employed therewith.

Referring now to the drawings, Figures 1 through 3 in particular, it will be seen that indicator means of my invention comprises a substantially rectangular housing 10 having opposed metal walls 11, 11 and suitable transparent plastic walls 11′, 11′. Housing 10 contains a Bakelite or other dielectric block or plug 12 at its lower end for closing over the same and for supporting in insulated fashion three spring elements 13, 14 and 15 which extend upwardly substantially the length of the hollow interior of the housing, as best illustrated in Figure 1. Spring 13 carries a weight means 16 intermediate its ends to form therewith a spring-weight system responsive to vibrational forces.

The upper end of the housing has a top wall 17 distinguished by an extending neck portion 18 received in a suitable opening formed in a seismically mounted arm 19, associated with bearing support means for a rotor or mass being tested. The outer end of the neck portion 18 above the upper face of the arm 19 supports a circular dial plate 20 over which is threaded a lock knob 21 engaged with threaded stud 22 secured to collar 18. Dial 20 works against an index pointer 23 fastened to arm 19, so that the scale means thereon, as shown best in Figure 2, may be set to a desired reading for adjusting the plane of the spring means 13 at selected angularity with respect to the longitudinal axis of the rotating mass, or that is, the axis about which the mass is rotated.

The spring-weight system formed by spring means 13 and weight means 16 comprises the vibration responsive portion of the improved indicator means of this invention. It will be noted from Figures 1 and 3, in particular, that the weight means 16 is attached to a resilient leaf spring 25 which is riveted or otherwise secured to one edge and one face of the weight member 16 by rivets 26, 26. Such spring 25 extends across the face of the flat weight-spring 13 and engages the same with sufficient friction to hold the weight 16 in place and provide a convenient means for slidingly positioning the same along the length of spring 13, as for example, to the dotted line position A shown in Figure 1.

In order to assist the operator in recognizing the position of weight 16 on spring 13, a scale means, calibrated for the spring-weight system and indicated by numerals 28, 28 in Figure 3 of the drawings, is provided on the exterior of the housing 10 to operate with a reference or index line 29 scribed in the face of the holding spring 25. By this means, the operator may regulate and set the exact frequency of vibration for the spring-weight system of the device. In the preferred embodiment illustrated, housing walls 11′ are preferably transparent so that weight 16 may be readily observed through the walls of the housing and aligned to a selected position on the scale means 28.

It will be noted that the spring member 13 is turned over at its upper or outer free end as at 30 and that the lower end thereof is securely held between a pair of insulating block members 31 and 32 of the insulator plug 12. The lower ends of springs 14 and 15 are likewise held between blocks 32 and 33, and 33 and 34, respectively. The entire assembly of blocks 31–34 is held in a compressed state to tightly grip the lower ends of springs 13, 14 and 15 by means of elongated screw members 35, 35 which are threadingly engaged with the plug means 12 and pass through the side walls of the housing 11 adjacent the lower end of the latter. If preferred, the entire insulator assembly 12 may comprise a cast of poured ceramic or like insulating material, or such may be formed from other suitable material such as molded rubber, or like dielectric to eliminate the need for the block members 31–34, if desired, although the assembly illustrated, is satisfactory in use.

As with spring 13, the upper end of intermediate spring 14 is turned outwardly as at 40 beneath the turned over portion 30 of spring 13 with the turned over portions 30 and 40 of springs 13 and 14, respectively having a gap or spacing 41, therebetween. While springs 13 and 14 are flat leaf springs, spring 15 is hairlike and extends across gap 41 as shown in Figure 1 of the drawings. All springs 13, 14 and 15 are preferably made of Elgin alloy material, a beryllium copper alloy. In a typical construction, springs 13 and 14 are preferably constructed with thickness of .010 to .040 inch while spring 15 is relatively hair-like and round with a diameter of .005 to .010 inch. Although spring 15 is extremely fine it is nevertheless capable of very light tensioning.

The upper end of spring 15 passes through an insulating block 42 having an internal slotted opening 43 for receiving such hair spring. Block 42 is fastened or fixed adjacent the upper end of the intermediate spring 14 and is engaged by an adjustment screw means 44 available to the operator externally of the housing and having for such purpose a knurled adjustment knob 45 thereon. Spring 14 is preferably held stationary, with its position of angularity with respect to springs 13 and 15 being regulated by adjusting the threaded adjustment screw means 44 as required. Preferably, spring 14 is placed under initial tension by adjusting screw means 44 and is aligned so that its outer free end registers with the outer end of spring 13.

An adjustment leaf element 50 of insulating material is disposed internally of housing 11 and substantially parallel to the three springs 13, 14 and 15; the same being held adjacent its lower end in the insulator assembly 12. The adjustment leaf member 50 carries a novel resistance unit including a semi-cylindrical insulator member 52 adjacent its upper end for engaging the hair like spring 15. This arrangement comprises a novel, variable resistor means, the details of which will be described more fully presently. The initial position of spring 15 is such that the same simultaneously contacts the free ends of the turned over portions 30 and 40 of springs 13 and 14, respectively; this association being regulated by the adjustment of the intermediate spring 14 through adjustment means 44. The adjustment of the hair like spring 15 and its contacting pressure with springs 13 and 14 is carried out by appropriately threading screw means 51 to move the leaf member 50 toward and away from the spring 15, as required.

From the foregoing description, it will be understood that the three springs 13, 14 and 15 are electrically insulated from each other and from housing 10 by means of the insulator assembly 12. The two springs 13 and 14 have a small gap 41 between their upper ends, as explained heretofore, across which the hair like spring 15 rests to short circuit all three springs at a neutral unstressed position for the spring-weight system comprising weight means 16 and leaf spring 13. The spring weight system moves toward and away from spring 14 in response to unbalanced forces attending the motion of the rotating mass under test. When spring 13 moves toward spring 14, the short circuit of the three springs is broken and circuit contact is established between springs 13 and 15. When spring 13 moves in a reverse direction or away from spring 14 and adjustment screw 44, contact is again established between all three springs 13, 14 and 15 as the three arrive at the position of static neutrality for the vibration responsive reed or spring 13 followed by the removal of spring 13 from the circuit relationship, leaving springs 14 and 15 in circuit engagement as spring 13 moves out of its position of static neutrality or to the right of its Figure 1 position. Thus, the motion and operation of the several spring means 13, 14 and 15 is established, the three springs acting in conjunction to formulate a switch mechanism capable of alternatingly establishing and disconnecting circuits between two of such springs on either side of the point of static neutrality for the vibration responsive spring weight system and for causing a complete short circuiting of all three springs at the said point of static neutrality.

Turning now specifically to the features of spring 15 and its association with the resistance member 52, reference is made to Figures 1, 4 and 5, in particular. The adjustment of the screw means 51 appropriately permits spring means 15 to rest with some resistance or contacting force against the semi-cylindrical outer surface of member 52 which is held on adjustment leaf 50 by spring clip members 53 and drive screws 54. By inspecting Figure 5 of the drawings, it will be noted that the semi-cylindrical surface of the insulator member 52 bears a strip portion 55 comprising an electrically conductive coating material or film forming a linear resistance. The thickness of the film and its length are controlled for producing variations in its resistance as desired. One suitable material for the film 55 is ordinary India ink. which comprises substantially a carbon suspension and provides a desirable high resistance.

Regarding now Figure 4 of the drawings, it will be noted that the spring 15, tangentially engages the resistor strip between a neutral and extreme flexed condition as denoted by the letters N and F; the last condition occurring, for example, at extreme vibrational motion of the spring weight system. In the neutral condition of the indicator, wherein the spring-weight system is in a position of static neutrality, the hair-like spring member 15 rests in tangential relationship with the semi-cylindrical surface of member 52 and engages the resistor strip or film 55 at point N. When spring 15 moves toward member 52, through corresponding movement of spring 13, the same is flexed substantially in the manner illustrated in Figure 4 so as to move its point of tangential engagement with the insulator member 52 toward point F. Such movement of the point of tangential engagement between the member 52 and spring 15 serves to alter the resistance presented by the portions of the strip or film 55 residing between the latter's point of tangential engagement with spring 15 and the ends of strip 55, circuit through 55 being established through the metal clip means 53 which are in electrical contact therewith.

Thus, a novel variable resistor is provided which is responsive, in its present application, to the vibrational motion imparted to spring 15 by the vibrational response and corresponding movement of the spring-weight system comprising spring 13 and weight 16. The manner in which such a variable resistance is employed in the operation of the unique indicator means of this invention will be better understood from descriptive materials which follow presently in association with the electrical circuitry set forth in Figure 6 of the drawings.

It will be recognized in Figure 6, that the three springs 13, 14 and 15 are shown in a neutral position wherein the same are all in contact adjacent their outer ends. Spring 13 is connected to a negative rail 60 by conductor 61 and springs 14 and 15 are joined to grids 62 and 63 of triode vacuum tubes 64 and 65. Springs 14 and 15 are also connected to negative rail 60 by conductor means 66 and 67, respectively, in circuit with resistance members 68 and 69; conductor 66 and resistor 68 being associated with tube 64 and conductor 67 and resistor 69 being associated with tube 65.

Spring 14 is connected by conductor 70 to the grid 63 of tube 65 while spring 15 is joined to grid 62 of tube 64 by conductor 71. Conductors 70 and 71, respectively, connect to voltage divider resistances 69 and 74 and 68 and 75 at junctions 72 and 73. The two resistances 74 and 75 are in circuit with conductors 76 and 77 and join a third conductor 78 at junction 79. Such conductor 78 is joined to the positive rail 80 at junction 81 with the negative and positive rails or main conductors being typically supplied with direct current at 300 v.

Plates 82 and 83 of tubes 64 and 65, respectively, are joined to conductor 78 at junction 84 across resistances 85 and 86. The cathodes 90, 91 of tubes 64, 65, respectively, are joined to a common conductor 92 and have circuit connection with a variable resistance 93 which is joined to the negative and positive rails 60 and 80 by conductors 94, 95 respectively.

With the above described arrangement, it will be recognized that when all three springs 13, 14 and 15 are in closed contact, as shown in Figure 6, the grids of vacuum tubes 64 and 65 are effectively connected to the negative rail 60, to halt current flow through such tubes because of the positive potential of their cathodes and thereby making the grids thereof highly negative. With all springs 13, 14 and 15 in open contact, such position being theoretical only in the present application of my improved indicator means, both tubes 64 and 65 conduct because they are supplied with positive bias through the voltage dividers 68, 75 for tube 64 and 69, 74 for tube 65.

Bearing the above generalities in mind, it will be recognized that starting in the neutral positions of springs 13, 14 and 15, as illustrated in Figure 6, both tubes 64 and 65 are non-conducting. Movement of the weight-spring 13 toward adjustment screw means 44 serves to open circuit between springs 13 and 14. Tube 65 now conducts while tube 64 is held in its negative bias or non-conductive condition because of engagement between springs 13 and 15.

When the weight-spring system moves away from screw 44, it first reaches its neutral unstressed position as illustrated in Figure 6. Thereat, both tubes are again placed in a non-conducting condition. As the weight-spring system moves farther away from the adjustment screw means 44, springs 14 and 15 are left in contact while spring 13 is removed from contact or circuit engagement therewith. Thus, the grids of tubes 64 and 65 are held positive and both tubes conduct.

From the foregoing, it will be understood therefore that tube 64 is energized and de-energized once for each cycle of complete motion for spring 13 with the making and breaking of contact for operation of such tube being established at the point of natural, unstressed neutrality of the spring-weight system. Tube 64 is accordingly preferably utilized to trip a conventional stroboscopic light circuit, indicated generally at 96 in Figure 6, at either the instant contact is established between springs 13 and 15 or at the instant contact is broken between such two springs, as desired.

In this manner, then, the angular position of unbalance may be indicated according to known practice, by the stroboscopic light system; the indication for such unbalance position always occurring at the instant the weight spring system is at its neutral unstressed point regardless of rotational speed for the rotor under test.

Associated with tubes 64 and 65 is a third tube, indicated generally by numeral 100, which is a twin electron ray tube or voltage indicator of the type used for radio tuning indicators termed "magic eyes." It will be understood that tube 100 includes a single cathode 101, a pair of grids 102, 103 and a single plate 104 common to the two grids. These two grids 102, 103 are, respectively, connected to conductors 87, 88, as by leads 105, 106. The cathode 101 of tube 100 is connected to conductor 92 by conductor 107. When both tubes 64 and 65 are non-conducting, tube 100 will present a complete circle of green light at its viewing end according to conventional and known practice. As will be recalled, when the spring-weight system moves toward the adjusting screw means 44 to break contact between springs 14 and 15, then tube 65 is placed in conducting condition. When this occurs, a shadow appears on the right hand envelope of tube 100 due to the fact that the right hand section thereof is made non-conductive. In reverse movement of the spring-weight system, when spring 13 moves away from adjustment screw means 44 and contact is established solely between springs 14 and 15 so that both tubes 64 and 65 conduct, then the entire green field normally presented by the tube 100 disappears, giving a black shadow appearance. Therefore, tube 100 is used to indicate the adjustment of screw means 44 and to indicate the position whereat spring 13 is exactly at its neutral position, as shown in Figure 6, and in which both tubes 64 and 65 are non-conducting. Turning the adjustment screw means 44 inwardly moves spring 14 to place tube 65 in a conducting condition. Conversely, turning screw 44 outwardly permits both tubes 64 and 65 to conduct. As mentioned, these two conditions are witnessed by a partial shadow in one envelope of the twin tube 100 or a full shadow across its presentation end. When exact center or neutral unstressed condition for spring 13 is reached, then the full green "eye" or field for tube 100 is presented to the operator. This type of visual adjustment indicator furnishes, in addition to the determination to the neutral unstressed position for spring 13, a single means for indicating which way screw means 44 must be adjusted to locate such neutral position of spring 13.

From the foregoing, it will be understood that the circuitry section at the left hand portion of Figure 6, as hereinabove described, constitutes a means for triggering a normal stroboscopic light at desired positions in the movement or cycle for the spring-weight system and always at the position where such spring 13 thereof is in its neutral unstressed condition.

With reference now to the upper right hand portion of the circuit shown in Figure 6, it will be seen that a high resistance direct current electrical bridge circuit is provided having four resistance arms 110, 111, 112 and 113. The electrical bridge network is supplied with direct current voltage through an adjustable voltage potentiometer circuit including resistor 115 and battery 116. The network, as shown, is in balance such that there is substantially zero voltage at the point of contact between spring 15 and the resistor strip 55 with respect to the mid-tap position of resistors 112, 113. The balanced mid-point of resistors 112, 113 is connected to diode tube 120 and triode tube 121 by means of conductors 122, 123, 124 and 125. Conductor 124 also joins the negative rail 60 across a capacitor 126 and a resistance 127 is shunted across such capacitor between conductor 125 and the negative rail 60. Because of the connection of the cathode 128 of tube 120 with resistances 112 and 113, such tube 120 will conduct only when the cathode is supplied with voltage negative with respect to the plate terminal of such tube.

A second diode electron tube 130 is also provided in circuit with the resistances 112, 113 and conductor 122; the same being associated with the center tap for such resistance by conductor 131. Conductor 133 connects the cathode 134 of such tube 130 to the negative rail 60. With this arrangement, tube 130 will conduct only potential which is positive with respect to the cathode 134 thereof. Thus, any varying voltage developed at the mid-point of resistors 112 and 113 will be passed through tubes 120 and 130, with the negative portion thereof being passed onto the grid 135 of tube 121 due to the fact that the output from tube 120 to such tube 121 is negative only. Therefore, any voltage more negative than the plate of tube 120 will charge capacitor 126 and swing the grid 135 of tube 121 more negative than its cathode 136. This voltage will be indicated by the volt meter 140 in the illustrated conventional vacuum tube volt meter circuit and including tube 121 and resistances 141 and 142 in circuit therewith.

With the above organization for the right hand section of the circuit in Figure 6 in mind, it will be noted that spring 15 rests with some tension against the resistor strip 55 and is in contact with the free end of spring 13. In the position of the several springs 13, 14 and 15, shown in Figure 6, tubes 64 and 65 are non-conducting and the several springs 13–15 are at negative potential due to connection with negative rail 60 via spring 13. If now the weight-spring 13 is moved towards resistor 55 or adjusting screw means 44, the engagement of the outer end of spring 13 with the outer end of the hair-like spring 15 will cause the latter to be connected effectively to the negative rail 60 and to force the hair-like spring 15 along the linear resistor element or strip 55 on the member 52. As the hair-like spring 15 rocks over the curved surface of member 52, the same serves to unbalance the bridge network heretofore described, the electrical unbalance increasing in proportion to the amount spring 15 moves along resistance strip 55 toward screw means 44. This action accordingly, makes the cathode of tube 120 more negative than the negative base rail 60 to charge condenser 126 an amount depending upon the value of resistor 127 which determines the discharge rate for capacitor 126. When the weight spring 13 moves in the direction away from the adjustment screw means 44, the positive grid voltage of tubes 64 and 65 is bypassed to the negative base rail 60 through the diode 130 thus completing the cycle.

With respect to the bridge network, the same is of a very high resistance in the order of several megohms preferably. The semi-circular resistor surface 55, over which spring 15 rocks, is also of a high resistance and constructed to vary with the length of the surface coating of film 55.

Because of the very small current requirement of the vacuum tube voltmeter of the character herein employed, almost zero contact pressure is required between the resistor 55 and spring 15. The same requirement is also maintained true as regards the engagement between the free ends of the several springs 13, 14 and 15.

It will be understood therefore, that the improved variable resistor comprising the hair-like spring 15 and the curvilinear resistor strip 55, presents a new and useful means for unbalancing the bridge network associated therewith in proportion to the amplitude of movement for the weight-spring 13. Such amplitude of movement is reflected by the reading of the voltmeter 140 by proportioning the voltage indication to the amplitude of motion and thus to the value of unbalance in the rotating mass under test. It is preferred, in an indicator of this type, that the scale on the meter means 140 be computed or set out in terms of weight measure so that the operator may read the value of unbalance directly from the scale of the indicating volt meter means 140.

Thus the present invention provides a new and useful combination of elements at very low cost which makes possible accurate indications in dynamic balance testing regardless of the speed of operation for the mass under test. The variable voltage bridge network and the potentiometer-like action of spring 15 over the curvilinear resistance 55 associated therewith provides an accurate system responsive to the movement of the spring-weight system. The unique feature of determining the exact position of unstressed neutrality for the weight-spring 13 with indication of screw movement presented visually on the tube 100 is also felt to be a valuable contribution in this art. Further, the alternate energization and de-energization of the vacuum tube 64 for triggering the stroboscopic circuit 96 of conventional and known design, serves to give the precise angular position of unbalance at various running speeds for the weight or mass under test; the triggering of such stroboscopic light circuit importantly occurring always at the position of exact neutrality or unstressed condition for the weight spring 13. This feature appears to be an entirely novel concept in the art of using spring-weight systems for indicators of this general class. It will also be appreciated that the indication of unbalance value on the constant input vacuum tube volt meter constitutes a new concept when employed in conjunction with the foregoing for a balancing apparatus of this type. Also, because of the potentiometer battery supply to the bridge network and because the volt meter readings for full scale deflection for any particular value of unbalance are controlled by the amount of voltage supplied to such bridge network, such scale value may be selected as desired to produce a range of scale values for the volt meter.

It is believed that those familiar with the art will thus recognize the foregoing to be a description of a marked and advanced improvement in this art and that they will readily understand that while I have herein described and shown the features and concepts of this invention in association with a particular device and circuit therefore, nevertheless, such may be varied and modified with substituted equivalents without necessarily departing from its inventive aspects. Therefore, while I have herein set forth my invention in relation to a particular preferred embodiment, it is not my intention that I be limited to such embodiment other than as may appear in the following appended claims.

I claim:

1. For use in a vibration responsive indicator of the class described, including a spring-weight system responsive to the vibrational forces imposed by an unbalanced rotor under test, a vacuum tube voltmeter and associated circuit to indicate the measure of unbalance, a variable resistor member comprising an insulator block having a semicylindrical surface, a linear proportional film of resistance material on said surface, a hair-like spring member tangentially engaged with said resistance material and movable along said linear resistance in response to the movement of the spring weight system, and a balanced bridge network in circuit with said variable resistor, spring member and voltmeter, the bridge network being normally balanced at the point of static neutrality for the spring-weight system with the variation of said resistor member according to the alteration of its point of tangential contact with said hair-like spring member serving to unbalance said network and reflect a proportionate change in the reading of the voltmeter.

2. In a vibration responsive indicator for use in a balance testing machine, the combination comprising, a first vibration responsive spring means, weight means adjustably attached to said spring means for regulating the vibrational frequency of the latter, second spring means mounted adjacent said first spring means, mounting means supporting both spring means in cantilever fashion and insulating the same one from the other, said first and second spring means being of parallel flexure type with the free end of said first spring means turned laterally in the direction of flexure whereby the free end of said first spring means may contact said second spring means and move same upon vibration, means for adjusting said second spring means to bring the outer free end thereof into contact with said first spring means at a position of static neutrality for the latter, a resistor member adjacent said second spring means and including an insulator having a curvilinear surface coated with a resistance film, said second spring means contacting said resistance film with tangential engagement so that its point of tangency moves along said film in response to vibrational movement imposed thereon by its periodic engagement with said first spring means and in proportion to the latter's amplitude of motion, a balanced bridge network in circuit with said resistor member, and vacuum tube voltmeter means in circuit with said bridge network, said first and second spring means being included in circuit with said bridge network and said voltmeter means, variation of said resistor member serving to unbalance said bridge network and produce a corresponding voltage change in the circuit, said voltage change being proportional to the amplitude of motion for said first spring means, and scale means on said voltmeter means for indicating the voltage in terms of weight measurement.

3. In a vibration responsive indicator for use in a balance testing machine, the combination comprising, first and second spring means mounted in parallel cantilever fashion, said first spring means being arcuately movable in response to vibrational motion of a mass under test, said first and second spring means being of parallel flexure type with the free end of said first spring means turned laterally in the direction of flexure whereby the free end of said first spring means may contact said second spring means and move same upon vibration, means for adjustably moving said second spring means to bring its outer free end into engagement with said first spring means at a position of static neutrality for the latter, variable resistor means adjacent said second spring means and operably engaged thereby, said resistor means having a curvilinear surface bearing a linear resistance film tangentially engaged by said second spring means, the outer end of said second spring means being periodically engaged and moved by said first spring means as the latter moves from its position of static neutrality theretoward in response to vibrational forces, the movement of said second spring means causing its point of tangential engagement with said resistance film to accordingly change and thereby vary the effective resistance of said resistor means, a bridge network in circuit with said resistor means, and voltmeter means in circuit with said bridge network for indicating voltage change, said first and second spring means being included in circuit with said bridge network and said voltmeter means, said bridge network being normally balanced when the said spring means are engaged at the said point of static neutrality and the variation of the resistor means serving to unbalance said bridge network in proportion to amplitude of motion of said spring means.

4. For use in balance testing machines, a vibration responsive indicator means comprising, a spring-weight means movable in response to vibrational movement of a mass under test and comprising a first flexure type spring having an end turned laterally in the direction of flexure, a second flexure type spring member adjacent said spring-weight means for periodic engagement by the laterally turned end of said first spring and movement with said first spring on one side of a point of static neutrality therefor, variable resistance means engaged and operated by said second spring member in accordance with the vibrational response of said spring-weight means and the movement therewith of said second spring member, and a voltmeter means in electrical circuit with said variable resistance means and said second spring member whereby changes in the amplitude of said spring-weight means is reflected in the voltage impressed on and indicated by said voltmeter in accordance to the corresponding variation of said variable resistance means.

5. A vibration responsive balance testing indicator comprising a first vibration responsive spring connected to electrical ground potential and a second spring, each of parallel flexure type, having a laterally turned end with said ends in proximate relation spaced by an air gap, a third parallel flexure type spring contacting said laterally turned ends of said first and second springs and bridging the gap between said ends when said first spring is in neutral position, said third spring being separated from contact with said second spring by cooperation of the laterally turned end of said first spring therewith upon flexure of said first spring in one direction, flexure of said first spring to neutral position in the opposite direction permitting contact of said third spring with said second spring while said first spring is in contact with said third spring, further flexure of said first spring in said opposite direction separating said first spring from said third spring while permitting said third spring to remain in contact with said second spring, a circuit including a stroboscope, tube means having its output connected to said circuit including a stroboscope, said tube means having a grid in circuit with said third spring for controlling said stroboscope, and separate tube means including a tube having a grid in circuit with said second spring for indicating when said first spring is in neutral position.

6. A vibration responsive balance testing indicator according to claim 5, including a weight mounted on said first spring for rendering said first spring vibration responsive, said weight being adjustable on said first spring for adjusting the vibrational frequency of said first spring.

7. A vibration responsive balance testing indicator according to claim 5, including means for adjusting said second spring relative to said first spring to align the laterally turned end of said second spring with the laterally turned end of said first spring.

8. A vibration responsive balance testing indicator according to claim 5, including a variable electrical resistance means mounted adjacent and operatively contacted by said third spring, a circuit having energizing means for said resistance means, the resistance character of said resistance means being varied by movement of contact of said third spring therewith in response to vibration of a mass under test and according to the responsive amplitude of motion of said first spring, and meter means responsive to voltage variations in the circuit including said resistance means.

9. A vibration responsive balance testing indicator according to claim 5, including a variable electrical resistance means mounted adjacent and operatively contacted by said third spring, a circuit having energizing means for said resistance means and comprising an insulator block having a curved surface provided with a resistance material with which said third spring has rocking contact upon flexure of said third spring, the resistance character of said resistance means being varied by movement of contact of said third spring therewith in response to vibration of a mass under test and according to the responsive amplitude of motion of said first spring, and meter means responsive to voltage variations in the circuit including said resistance means.

10. A vibration responsive balance testing indicator according to claim 5, including a variable electrical resistance means mounted adjacent and operatively contacted by said third spring, a circuit having energizing means for said resistance means, the resistance character of said resistance means being varied by movement of contact of said third spring therewith in response to vibration of a mass under test and accoding to the responsive amplitude of motion of said first spring, meter means responsive to voltage variations in the circuit including said resistance means, and means for moving said resistance means toward and away from said third spring to vary the contacting pressure between said third spring and said resistance means and the contacting pressure between said third spring and the laterally turned ends of said first and second springs.

11. A vibration responsive balance testing indicator according to claim 5, including a twin electron ray tube with the separative tube means which includes a tube having a grid in circuit with the second spring.

12. A vibration responsive balance testing indicator according to claim 5, including means for adjusting said second spring relative to said first spring to align the laterally turned end of said second spring with the laterally turned end of said first spring, a variable electrical resistance means mounted adjacent and operatively contacted by said third spring, a circuit having energizing means for said resistance means, the resistance character of said resistance means being varied by movement of contact of said third spring therewith in response to vibration of a mass under test, and according to the responsive amplitude of motion of said first spring, meter means responsive to voltage variations in the circuit including said resistance means, and means for moving said resistance means toward and away from said third spring to vary the contacting pressure between said third spring and the laterally turned ends of said first and second springs.

References Cited in the file of this patent

UNITED STATES PATENTS

| | | |
|---|---|---|
| 2,064,489 | Neuman | Dec. 15, 1936 |
| 2,392,937 | McDaniel | Jan. 15, 1946 |
| 2,740,297 | Phelps | Apr. 3, 1956 |

FOREIGN PATENTS

| | | |
|---|---|---|
| 740,810 | Great Britain | Nov. 23, 1955 |